United States Patent [19]
Wilbourn et al.

[11] Patent Number: 5,226,261
[45] Date of Patent: Jul. 13, 1993

[54] TENT APPARATUS

[76] Inventors: David R. Wilbourn; Jack L. Petty, both of 6548 E. 26th Pl., Tulsa, Okla. 74129

[21] Appl. No.: 699,637

[22] Filed: May 14, 1991

[51] Int. Cl.⁵ .............................................. E04B 1/34
[52] U.S. Cl. ...................................... 52/2.21; 52/2.22
[58] Field of Search .............. 52/2.11, 2.13, 2.17, 52/2.18, 2.21, 2.22, 2.24; 135/115, 119, 904; 206/223, 321

[56] References Cited

U.S. PATENT DOCUMENTS

| | | | |
|---|---|---|---|
| 3,441,037 | 4/1969 | Transeau | 135/904 X |
| 3,688,787 | 9/1972 | Feather | 135/115 X |
| 4,000,585 | 1/1977 | Denaro | 52/2.17 |
| 4,027,437 | 6/1977 | Monsky et al. | 52/2.17 X |
| 4,310,194 | 1/1982 | Biller | 135/88 X |
| 4,369,591 | 1/1983 | Vicino | 52/2.24 X |
| 4,504,049 | 3/1985 | Straub | 135/88 X |
| 4,556,391 | 12/1985 | Tardivel et al. | 52/2.24 X |
| 4,607,876 | 8/1986 | Reed | 135/88 X |
| 4,652,040 | 3/1987 | Mahan | 296/159 |
| 4,819,389 | 4/1989 | Kihn | 52/2.21 |
| 4,926,893 | 5/1990 | Klopfenstein | 135/119 X |
| 5,007,212 | 4/1991 | Fritts et al. | 52/2.18 |

FOREIGN PATENT DOCUMENTS

| | | | |
|---|---|---|---|
| 0755885 | 4/1967 | Canada | 52/2.18 |
| 2634873 | 2/1978 | Fed. Rep. of Germany | 52/2.18 |
| 0456325 | 12/1950 | Italy | 135/904 |
| 0511129 | 3/1959 | Italy | 52/2.18 |
| 8903468 | 4/1989 | World Int. Prop. O. | 52/2.13 |

*Primary Examiner*—Carl D. Friedman
*Assistant Examiner*—Lan M. Mai
*Attorney, Agent, or Firm*—Leon Gilden

[57] ABSTRACT

A unitary pneumatic base chamber in pneumatic communication with a series of arcuate hoops extending upwardly and generally orthogonally relative to the base chamber when the base chamber and hoops are in an inflated configuration. Flexible mesh web panels are mounted coextensively between the hoop members and base chamber member, including a rear and forward flap construction closing off the ends of the tent when in an erected configuration. The front flap includes a plurality of flap panels, with a central zipper for selective securement of the flap panels in a closed configuration. A transport container is utilized for receiving the tent structure when in deflated configuration, and further includes a pocket for mounting a manual pump and fluid impermeable cover web. Modifications of the invention include the base chamber member formed with spaced parallel horizontal through-extending pockets intercommunicating with vertical pockets, wherein each pocket receives a leg member, wherein the leg members are securable together to provide for a reinforcing spine to maintain structural integrity of the organization during partial deflation and potential leakage of the tent structure.

3 Claims, 7 Drawing Sheets

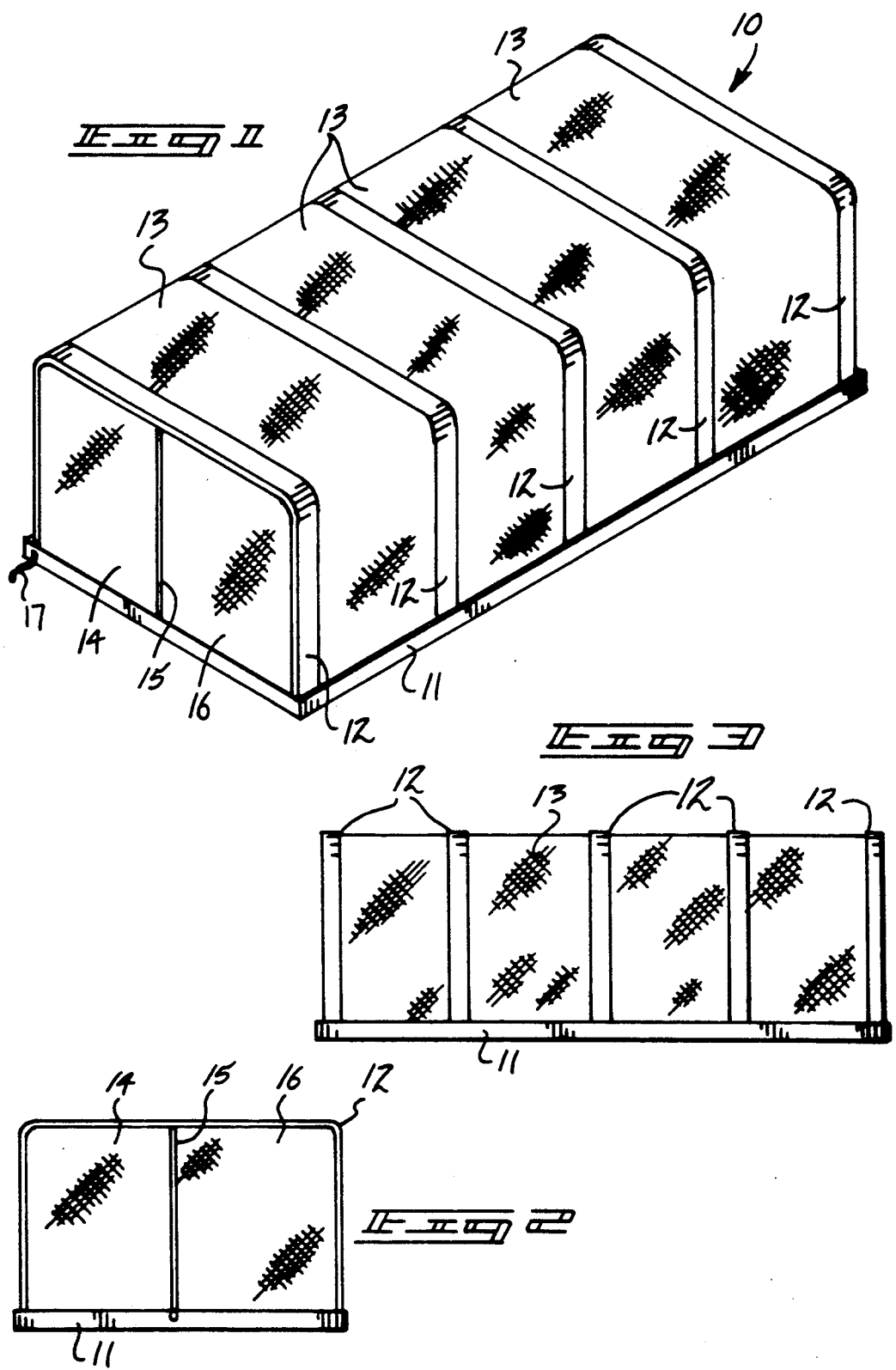

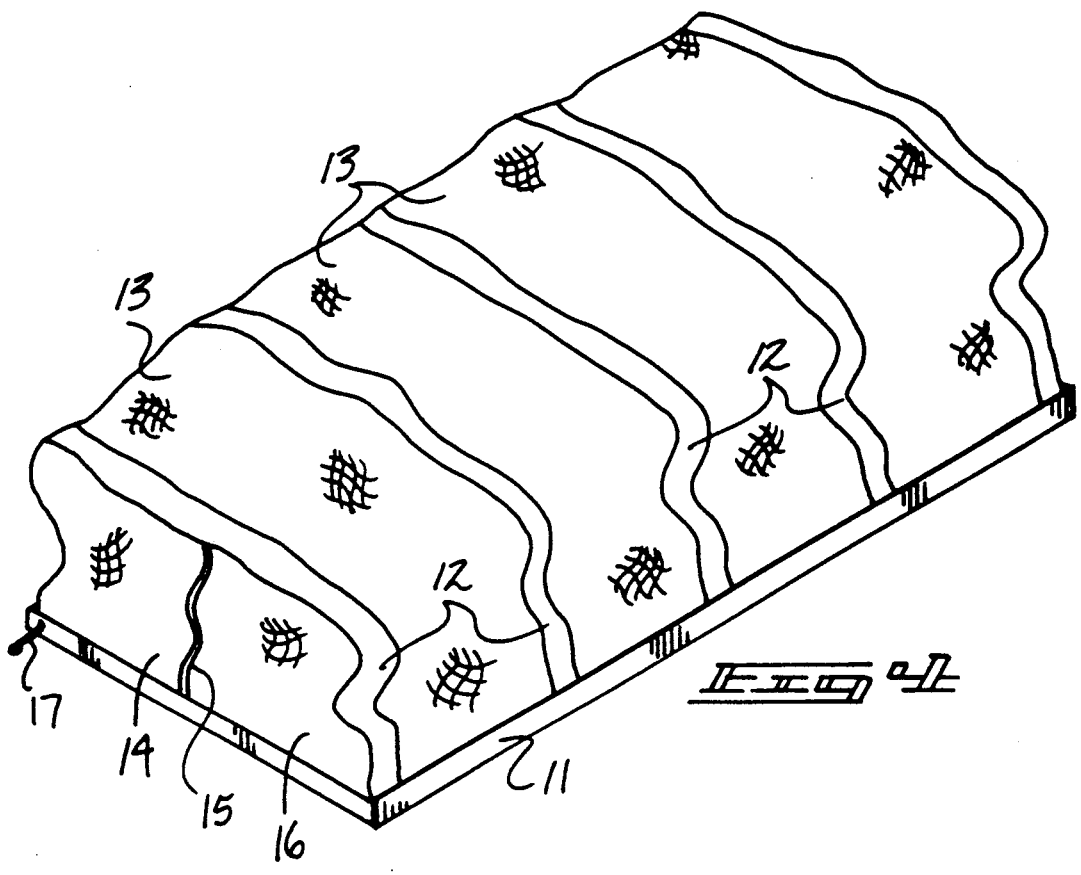
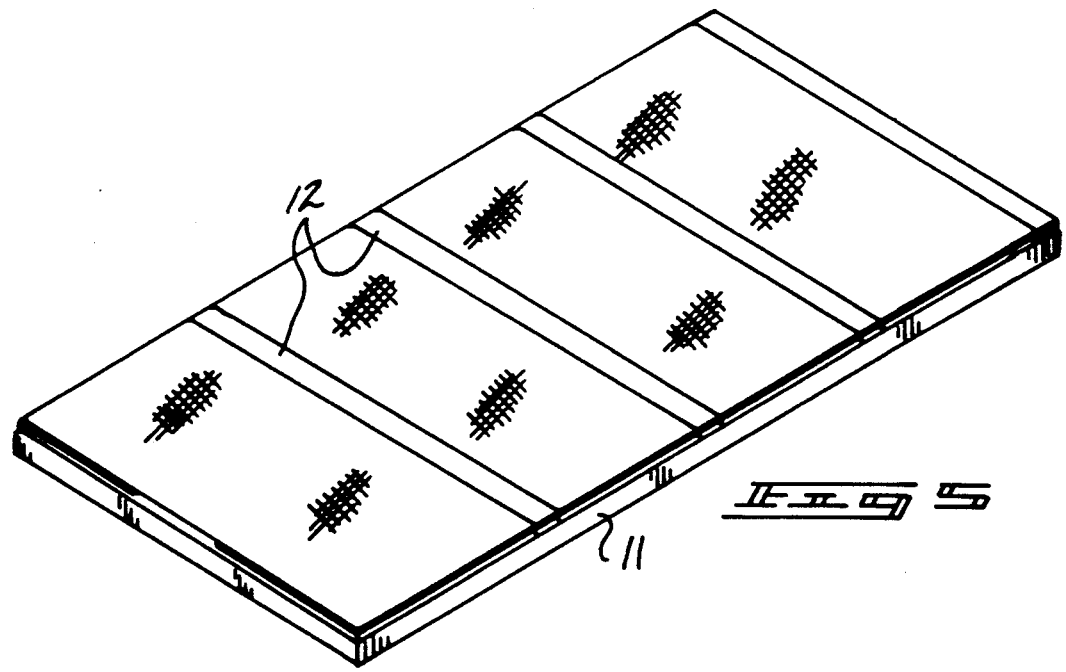

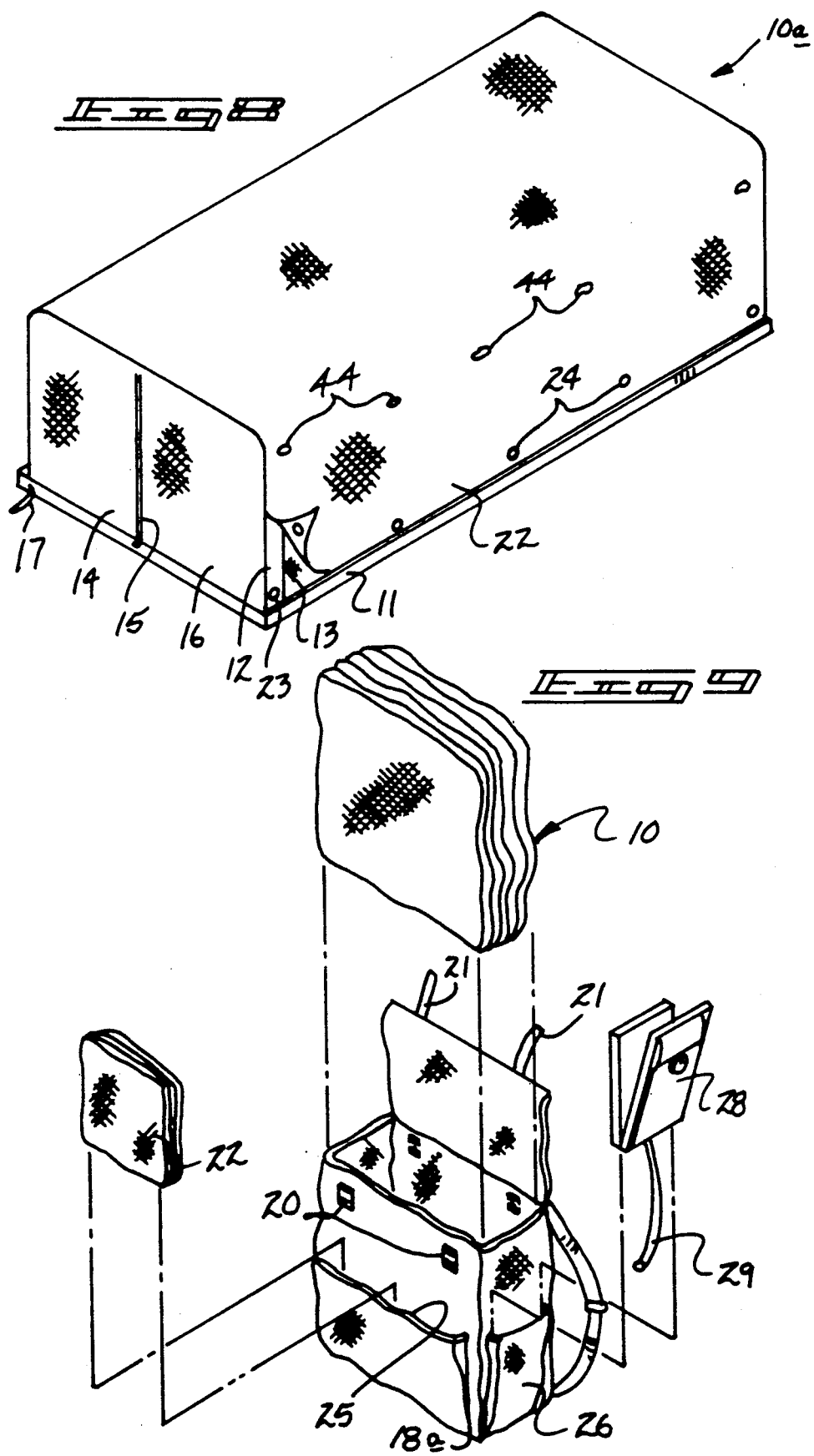

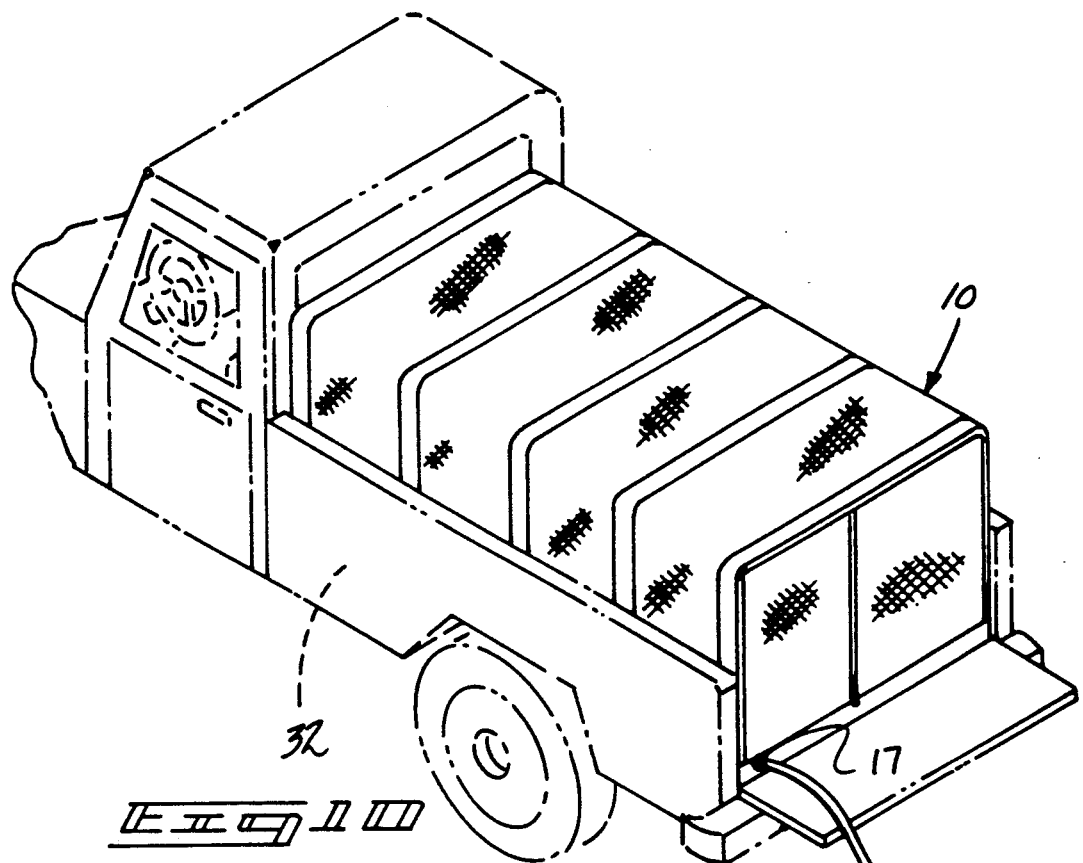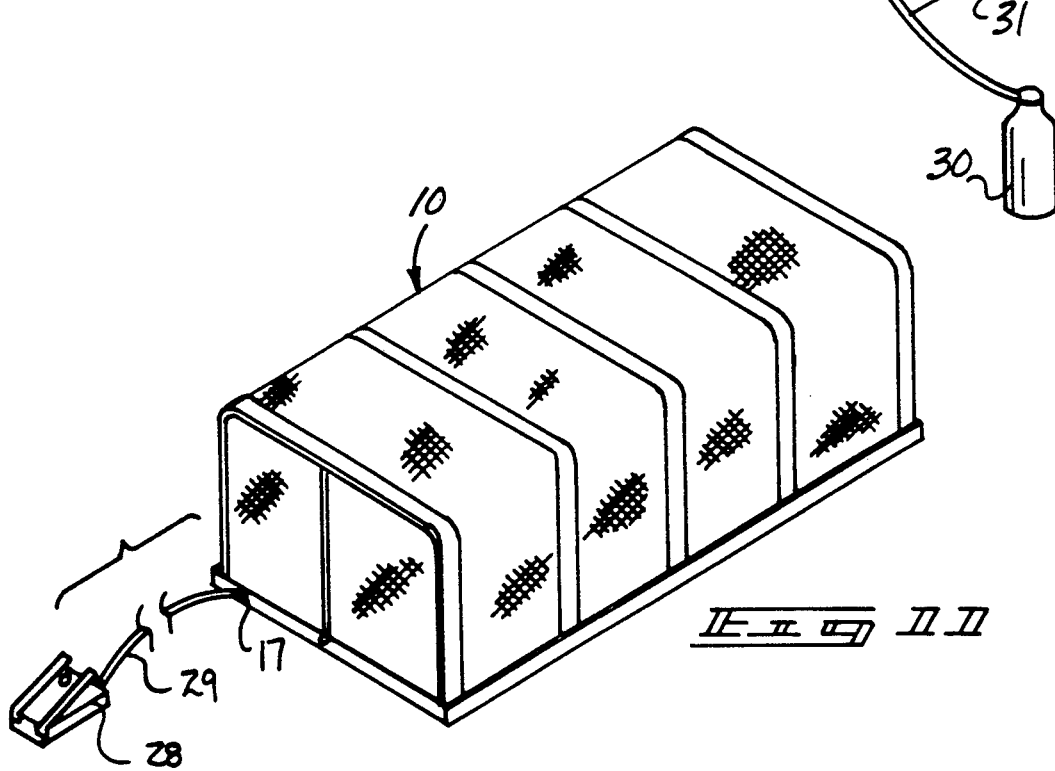

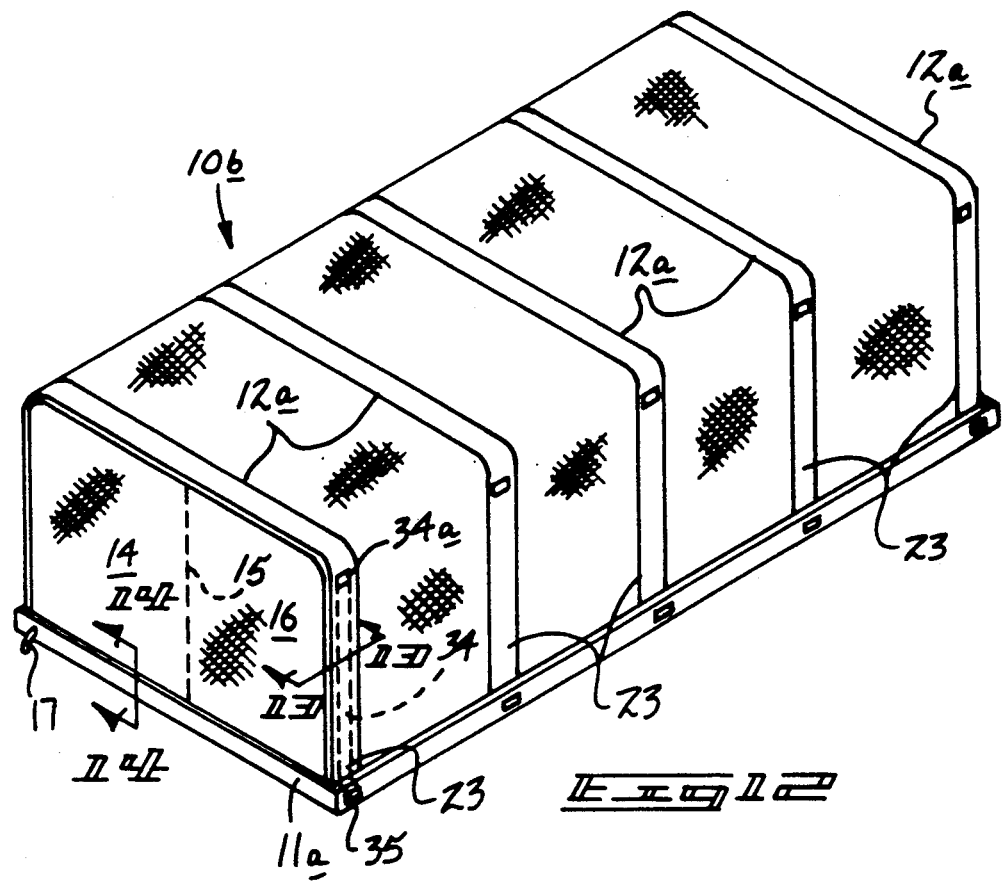
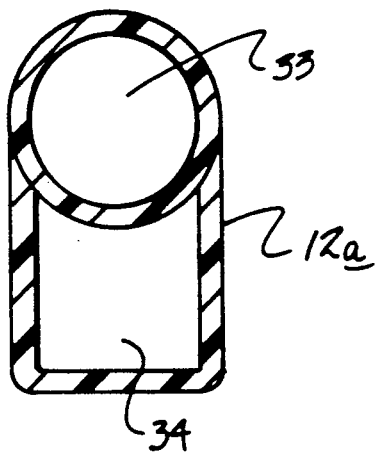
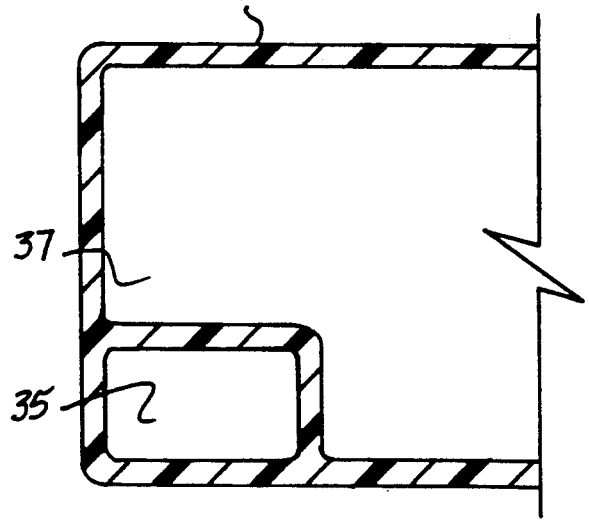

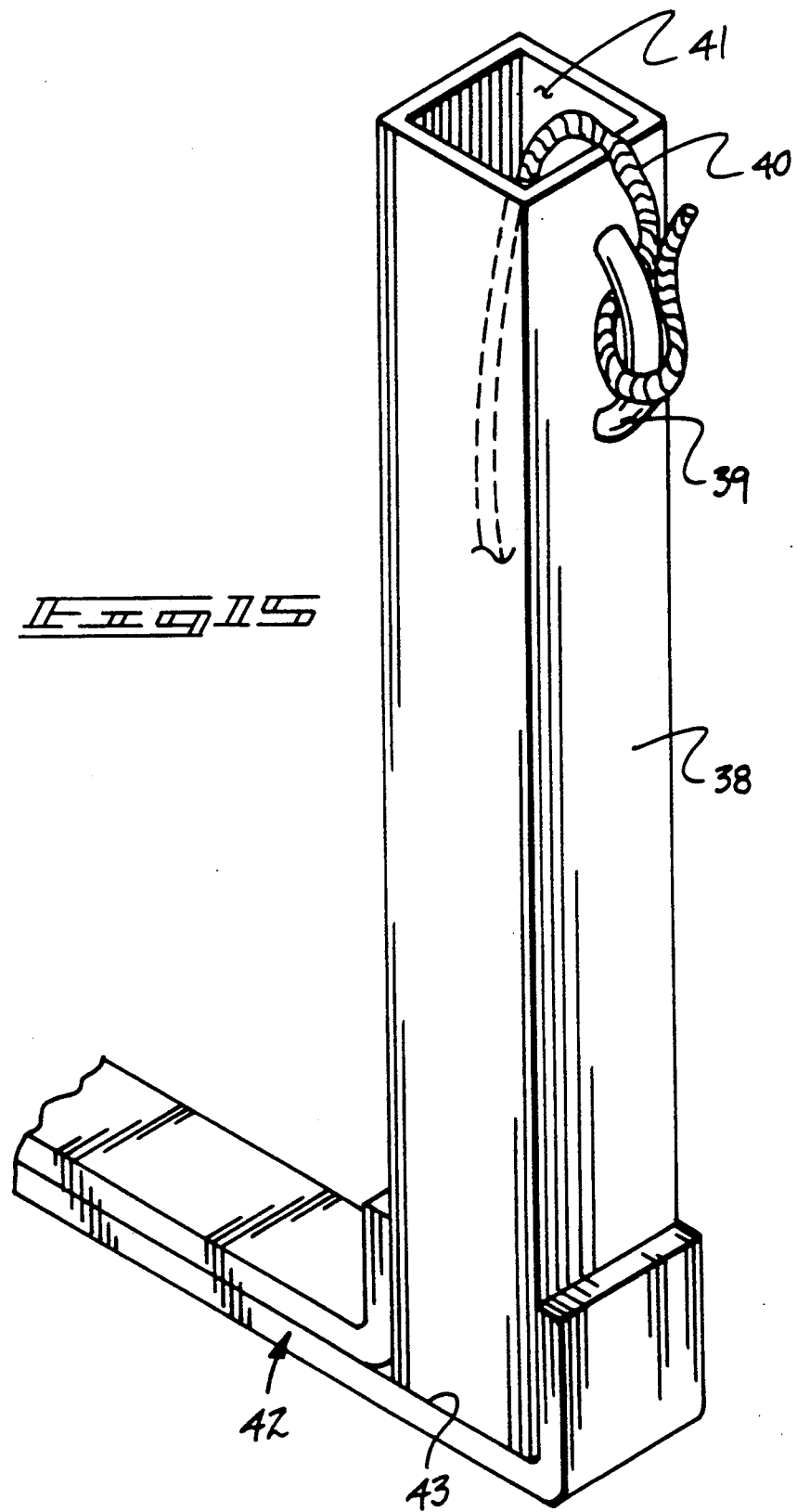

TENT APPARATUS

BACKGROUND OF THE INVENTION

1. Field of the Invention

The field of invention relates to tent apparatus, and more particularly pertains to a new and improved tent apparatus wherein the same is readily transported and mounted during periods of use and need by individuals in backpacking and camping scenarios.

2. Description of the Prior Art

Tent structures of various types are utilized throughout the prior art for individuals in backpacking and camping procedures. Apparatus in such organizations requires compactness and lightness of construction, as well as application and use in various positions and configurations. Such a tent structure is set forth and exemplified in U.S. Pat. No. 4,566,729 to Magnino wherein a tent member is mounted fixedly within a truck bed for erection relative thereto.

Similarly, U.S. Pat. No. 4,652,040 to Mahan sets forth a pickup truck bed and tail gate forming an envelope in conjunction with a tent structure fixedly mounted to the truck bed.

U.S. Pat. Nos. 4,504,049 to Straub; 4,310,194 to Biller; and 4,607,876 to Reed provide for covering structure for use as tent and camping arrangements for use in combination with truck beds.

Accordingly, it may be understood that there is a need for a new and improved tent apparatus as set forth by the instant invention wherein the same is applicable to various camping situations for use within a truck bed or in a free-standing configuration and in this respect, the present invention substantially fulfills this need.

SUMMARY OF THE INVENTION

In view of the foregoing disadvantages inherent in the known types of tent apparatus now present in the prior art, the present invention provides a tent apparatus wherein the same is readily inflated and directed in various configurations and orientations in use and readily interfolded and stored within a container for transport and storage thereof. As such, the general purpose of the present invention, which will be described subsequently in greater detail, is to provide a new and improved tent apparatus which has all the advantages of the prior art tent apparatus and none of the disadvantages.

To attain this, the present invention provides a unitary pneumatic base chamber in pneumatic communication with a series of arcuate hoops extending upwardly and generally orthogonally relative to the base chamber when the base chamber and hoops are in an inflated configuration. Flexible mesh web panels are mounted coextensively between the hoop members and base chamber member, including a rear and forward flap construction closing off the ends of the tent when in an erected configuration. The front flap includes a plurality of flap panels, with a central zipper for selective securement of the flap panels in a closed configuration. A transport container is utilized for receiving the tent structure when in deflated configuration, and further includes a pocket for mounting a manual pump and fluid impermeable cover web. Modifications of the invention include the base chamber member formed with spaced parallel horizontal through-extending pockets intercommunicating with vertical pockets, wherein each pocket receives a leg member, wherein the leg members are securable together to provide for a reinforcing spine to maintain structural integrity of the organization during partial deflation and potential leakage of the tent structure.

My invention resides not in any one of these features per se, but rather in the particular combination of all of them herein disclosed and claimed and it is distinguished from the prior art in this particular combination of all of its structures for the functions specified.

It is therefore an object of the present invention to provide a new and improved tent apparatus which has all the advantages of the prior art tent apparatus and none of the disadvantages.

It is another object of the present invention to provide a new and improved tent apparatus which may be easily and efficiently manufactured and marketed.

It is a further object of the present invention to provide a new and improved tent apparatus which is of a durable and reliable construction.

An even further object of the present invention is to provide a new and improved tent apparatus which is susceptible of a low cost of manufacture with regard to both materials and labor, and which accordingly is then susceptible of low prices of sale to the consuming public, thereby making such tent apparatus economically available to the buying public.

Still yet another object of the present invention is to provide a new and improved tent apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic front view, taken in elevation, of the instant invention.

FIG. 3 is an orthographic side view of the instant invention, taken in elevation.

FIG. 4 is an isometric illustration of the invention, in a partially folded configuration.

FIG. 5 is an isometric illustration of the invention in a flattened configuration.

FIG. 8 is an isometric illustration of a modified aspect of the invention utilizing a covering web coextensively mounted about the top and sides thereof.

FIG. 9 is an isometric illustration of the invention for use in a modified container structure.

FIG. 10 is an isometric illustration of the invention mounted within a truck bed.

FIG. 11 is an isometric illustration of the invention in association with a manual air pump.

FIG. 12 is an isometric illustration of a modified construction of the tent structure of the invention.

FIG. 13 is an orthographic view, taken along the lines 13—13 of FIG. 12 in the direction indicated by the arrows.

FIG. 14 is an orthographic view, taken along the lines 14—14 of FIG. 12 in the direction indicated by the arrows.

FIG. 15 is an isometric illustration of the support legs utilized in conjunction with the modified construction of the invention, as set forth in FIG. 12.

DESCRIPTION OF THE PREFERRED EMBODIMENT

Figure 6:
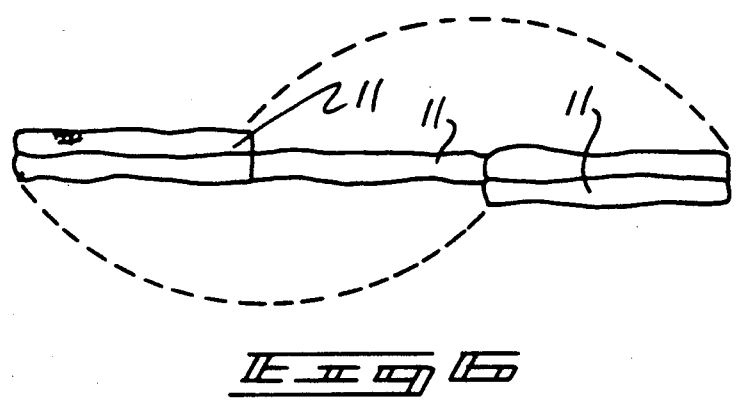
FIG. 6 is an orthographic side view of the invention in a configuration for interfolding thereof.

With reference now to the drawings, and in particular to FIGS. 1 to 15 thereof, a new and improved tent apparatus embodying the principles and concepts of the present invention and generally designated by the reference numerals 10, 10a, and 10b will be described.

More specifically, the tent apparatus 10 of the instant invention essentially comprises a tent housing defined by a pneumatic base chamber member 11. The base chamber member 11 is in pneumatic communication with a series of spaced arcuate tubular hoop members 12 and when inflated are orthogonally oriented to a top surface of the base chamber member 11 adjacent opposed side edges thereof. Flexible web mesh panels 13 are mounted coextensively between adjacent hoop members 12 to define a covering roof. The structure includes a rear flap covering a rear opening of the structure and a frontal flap defined by a first and second flap web 14 and 16, with a medially positioned zipper 15 directed therebetween, wherein the zipper is orthogonally oriented relative to the base chamber member 11. Inflation valve 17 is directed through a side wall of the base chamber member 11 to provide selective inflation thereof.

Figure 7:
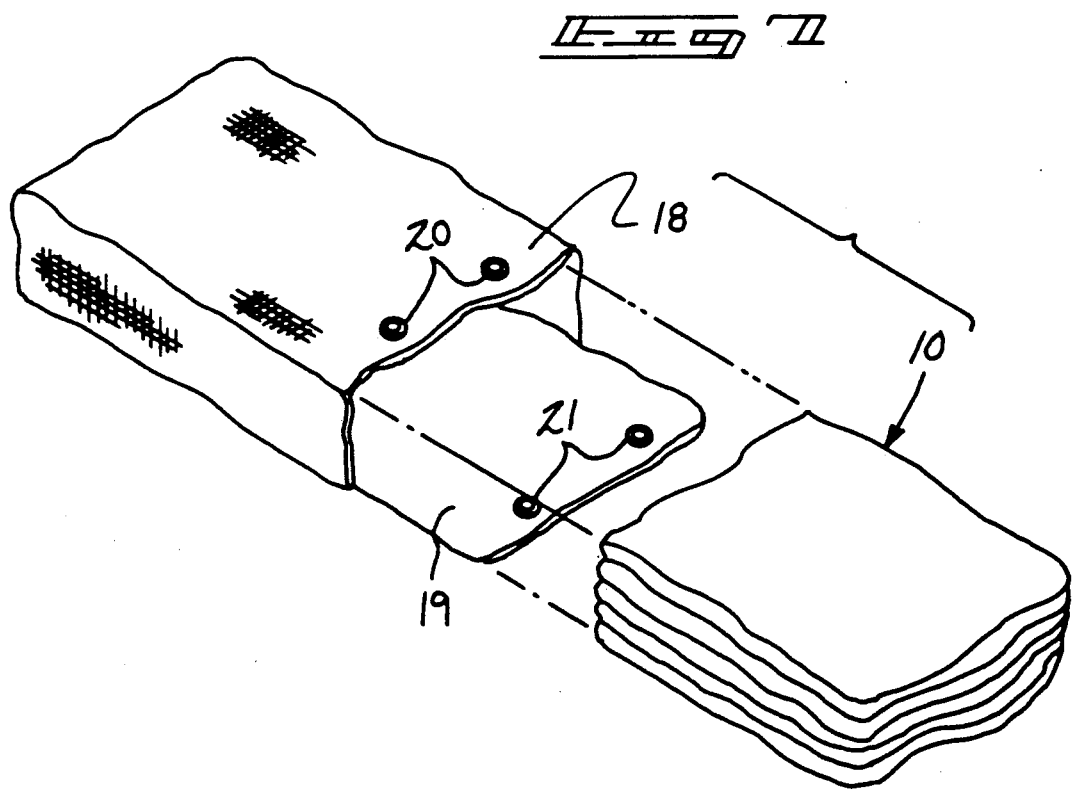
FIG. 7 is an isometric illustration of the tent structure arranged for reception within an associated container.

Further, reference to FIG. 7 illustrates the use of a flexible container 18, including a cover flap 19, including first fasteners 20 mounted to an interior surface of the flap 19 adjacent a free terminal edge of the flap cooperative with second fasteners 21 mounted to a front wall of the container 18. When the tent structure is in a inflated configuration, as illustrated, it is received within the central pocket defined by the container 18 for transport and storage of the organization.

FIG. 8 illustrates the use of a modified tent apparatus 10a, including a unitary fluid impermeable cover web 22 positionable coextensively over the hoop members 12 and the intermediate mesh panels 13 to provide a rain flap for the organization. The cover web 22 includes third fasteners 23 of a snap fastener configuration spaced apart a predetermined spacing adjacent side edges of the cover web cooperative with fourth fasteners 24 mounted adjacent lower terminal ends of each of the hoop members 12 to effect securement of the cover web 22 relative to the hoop members 12. Accordingly, the cover web extends coextensively between the front and rear flap webs of the tent structure.

FIG. 9 illustrates the use of a pneumatic pump 28 operative as illustrated in FIG. 11, that includes a pneumatic pump 28 and a pump conduit 29 securable to the inflation valve 17 to effect inflation of the tent structure when in a collapsed configuration to effect inflation of the intercommunicating base chamber member 11 and the associated hoop members 12. A modified container 18a is utilized, as illustrated in FIG. 9, that is formed with a front wall pocket 25 to receive the cover web 12 when the cover web is in a folded configuration and a side wall pocket 26 integrally mounted to a side wall of the container 18a to receive the pneumatic pump 28 therewithin. The first and second fasteners 20 and 21, as illustrated in FIG. 9, are of a hook and loop construction for intercommunication and securement of the flap relative to the front panel of the container. FIG. 10 illustrates the organization of a complementary configuration to an interior cavity of a pickup truck bed 32 utilizing alternatively a pressurized pneumatic container 30, with an associated container conduit 31 to effect instantaneous inflation of the base chamber member 11 and the associated pneumatically communicating members 12.

FIG. 12 illustrates the use of a further modified tent apparatus 10b, wherein the organization includes modified arcuate tubular hoop members 12a mounted to a modified pneumatic base chamber member 11a that is described above, but wherein each of the hoop members 12a includes a pneumatic hoop member chamber 33 in pneumatic communication with a chamber 37. Each hoop member 12a includes a vertical leg member receiving pocket 34 defined by a predetermined length coextensive with each vertical length of each leg member for receiving a vertical leg member 38, as illustrated in FIG. 15. Each vertical leg member 38 is of a predetermined length equal to the predetermined length defined by each leg member defined between the modified base member 11a and the vertical leg member receiving pocket upper opening 34a. The modified base member 11a includes a series of horizontal leg member receiving pockets 35 orthogonally oriented relative to each vertical leg member receiving pocket 34 and orthogonally bisecting each vertical leg member receiving pocket 34. The vertical leg member receiving pockets 34a are spaced apart the predetermined spacing equal to the predetermined spacing defined between each of the vertical leg member receiving pockets 34. Each of the horizontal leg member receiving pockets 35 includes a horizontal leg member 42 received therethrough. Each horizontal leg member 42 includes a socket 43 defined by spaced vertical leg segments spaced apart a predetermined width equal to a predetermined width defined by each of the vertical leg members 38. Adjacent an upper terminal end of each vertical leg member 42 is a loop member 39 mounting a flexible tether line 40 thereon. The flexible tether line 40 is stored within the vertical leg member cavity 41 and removed therefrom for tying down the organization when positioned on a surface, such as a camping field and the like, as opposed to being positioned within the pickup truck bed, as illustrated in FIG. 10. The cover web 12 further includes cover web openings 44 spaced apart the predetermined spacing to receive a respective loop member 39 therethrough to permit use of the cover web in association with the vertical leg members 38. The loop member 39 is spaced from a lower terminal end of each vertical leg member a further spacing defined by a distance between the horizontal leg member 42 and the vertical leg member receiving pocket upper opening 34a. The cover web openings 44 are also spaced from a lower edge of each side edge of the cover member an equal further spacing to align the cover web openings 44 with the vertical leg member receiving pockets upper opening 34a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tent apparatus, comprising in combination,
   a unitary pneumatic base chamber member, the pneumatic base chamber member including a top surface, and
   the top surface integrally and orthogonally mounting a plurality of arcuate tubular hoop members, each hoop member including a hoop member chamber, with hoop member chamber of the plurality of hoop members in pneumatic communication with the pneumatic base chamber member, and
   the pneumatic base chamber member including a pneumatic base chamber, wherein the pneumatic base chamber is in pneumatic communication with each hoop member chamber, and
   an inflation valve directed through the pneumatic base chamber member in pneumatic communication with the pneumatic base chamber for pneumatic inflation and deflation of the base chamber and each hoop member chamber, and
   a flexible web mesh panel mounted coextensively between adjacent hoop members, and
   the pneumatic base chamber member including at least a forward flap, the forward flap including a first flap web and a second flap web, the first flap web and the second flap web including a zipper selectively securing the first flap web and the second flap web together, and
   a pneumatic pump, the pneumatic pump including a pneumatic pump conduit selectively securable to the inflation valve, and further including a unitary flexible fluid impermeable cover web, the cover web positionable coextensively over the plurality of hoop members and the web mesh panels, and each hoop member including a first fastener mounted to each hoop member adjacent the base chamber member top surface, and each first fastener spaced apart a predetermined spacing, and the cover web including spaced elongate side edges, and each side edge including a series of second fasteners spaced apart the predetermined spacing wherein the second fasteners are securable to the first fasteners, and
   a flexible container, the flexible container including a central cavity means for receiving the base chamber member and the plurality of tubular hoop members when in a deflated interfolded configuration, and a forward wall pocket mounted to a forward wall of the flexible container for receiving the cover web when the cover web is in an interfolded configuration, and a side wall pocket mounted fixedly to a side wall of the flexible container for receiving the pneumatic pump.

2. An apparatus as set forth in claim 1 wherein each hoop member includes a plurality of elongate vertical leg member receiving pockets, each pocket defined by a predetermined length spaced from the top surface of the base chamber member to a vertical leg member pocket upper opening, and each vertical leg member receiving pocket slidably receiving a vertical leg member therewithin, and the pneumatic base chamber member including a horizontal leg member receiving pocket, and each horizontal leg member receiving pocket orthogonally intersecting a vertical leg member receiving pocket, and the horizontal leg member receiving pocket including a horizontal leg member selectively positionable therewithin, and each horizontal leg member including at least one socket, each socket defined by spaced vertical leg segments, wherein each of the vertical leg segments arranged for receiving the vertical leg member orthogonally relative to the horizontal leg member, and a loop member mounted adjacent an upper terminal end of each vertical leg member, and the loop member including a tether line secured about each loop member, and the vertical leg member including a vertical leg member cavity arranged for storage of the tether line therewithin, wherein each tether line of each vertical leg member arranged for stabilizing securement of the tent apparatus to an underlying surface.

3. An apparatus as set forth in claim 2 wherein the cover web includes a plurality of cover web openings, and each of the cover web openings aligned with a loop member when the cover web is mounted to the hoop members.

* * * * *